United States Patent
Thomas et al.

(10) Patent No.: US 10,675,790 B2
(45) Date of Patent: Jun. 9, 2020

(54) SYSTEM AND METHOD FOR AFFIXING REFERENCE DOTS WITH RESPECT TO MODELING IMPRESSION MATERIALS

(71) Applicant: United Technologies Corporation, Farmington, CT (US)

(72) Inventors: Peter Holman Thomas, Singapore (SG); Wei Chiang Lee, Singapore (SG)

(73) Assignee: Raytheon Technologies Corporation, Farmington, CT (US)

(*) Notice: Subject to any disclaimer, the term of this patent is extended or adjusted under 35 U.S.C. 154(b) by 0 days.

(21) Appl. No.: 16/167,742

(22) Filed: Oct. 23, 2018

(65) Prior Publication Data
US 2019/0054665 A1 Feb. 21, 2019

Related U.S. Application Data

(62) Division of application No. 14/872,362, filed on Oct. 1, 2015, now Pat. No. 10,137,605.

(51) Int. Cl.
| | | |
|---|---|---|
| *B29C 33/44* | (2006.01) | |
| *G01B 21/20* | (2006.01) | |
| *G01B 11/24* | (2006.01) | |
| *B29C 39/10* | (2006.01) | |
| *B29C 39/36* | (2006.01) | |

(52) U.S. Cl.
CPC .............. *B29C 33/44* (2013.01); *B29C 39/10* (2013.01); *B29C 39/36* (2013.01); *G01B 11/24* (2013.01); *G01B 21/20* (2013.01)

(58) Field of Classification Search
CPC ...................................................... B29C 33/44

USPC ......................................................... 264/273
See application file for complete search history.

(56) References Cited

U.S. PATENT DOCUMENTS

| | | |
|---|---|---|
| 4,830,443 A | 5/1989 | Hecker et al. |
| 5,018,803 A | 5/1991 | Hecker et al. |
| 5,400,428 A | 3/1995 | Grace |
| 5,438,449 A | 8/1995 | Chabot et al. |
| 5,465,142 A | 11/1995 | Krumes et al. |
| 5,504,595 A | 4/1996 | Marom et al. |
| 5,506,703 A | 4/1996 | Suzuki et al. |
| 5,555,130 A | 9/1996 | Marom et al. |
| 5,900,954 A | 5/1999 | Katz et al. |
| 6,279,246 B1 * | 8/2001 | van den Bossche .. G01B 11/00 33/1 CC |
| 6,319,006 B1 | 11/2001 | Scherer et al. |
| 6,516,897 B2 | 2/2003 | Thompson |

(Continued)

FOREIGN PATENT DOCUMENTS

| | | |
|---|---|---|
| KR | 101100443 B1 | 12/2011 |
| WO | 2014024014 A1 | 2/2014 |

(Continued)

*Primary Examiner* — Matthew J Daniels
*Assistant Examiner* — Hana C Page
(74) *Attorney, Agent, or Firm* — Bachman & LaPointe, P.C.

(57) ABSTRACT

A holder to facilitate optical data acquisition includes a float portion that extends from a handle portion to at least partially support the handle portion with respect to a surface of the liquid modeling impression material. A method of optical data acquisition includes communicating a liquid modeling impression material into a non-line of sight feature of a workpiece and immersing a portion of a holder into the liquid modeling impression material.

2 Claims, 7 Drawing Sheets

(56) References Cited

U.S. PATENT DOCUMENTS

| | | | |
|---|---|---|---|
| 7,532,332 B2 | 5/2009 | Gomercic et al. | |
| 7,573,586 B1 | 8/2009 | Boyer et al. | |
| 7,574,035 B2* | 8/2009 | Koonankeil | F01D 5/005 |
| | | | 348/86 |
| 7,578,178 B2* | 8/2009 | Boyer | F01D 25/285 |
| | | | 73/112.01 |
| 7,869,026 B2 | 1/2011 | Boyer et al. | |
| 8,274,663 B2 | 9/2012 | Pan et al. | |
| 9,310,312 B2* | 4/2016 | Jahnke | G06T 7/174 |
| 2007/0293769 A1* | 12/2007 | Doherty | G01B 11/24 |
| | | | 600/476 |
| 2014/0208665 A1 | 7/2014 | Kapitza et al. | |
| 2015/0000387 A1* | 1/2015 | Jiang | F01D 5/147 |
| | | | 73/112.01 |

FOREIGN PATENT DOCUMENTS

| | | | |
|---|---|---|---|
| WO | WO-2014024014 A1 * | 2/2014 | |
| WO | 2014134057 A1 | 9/2014 | |

\* cited by examiner

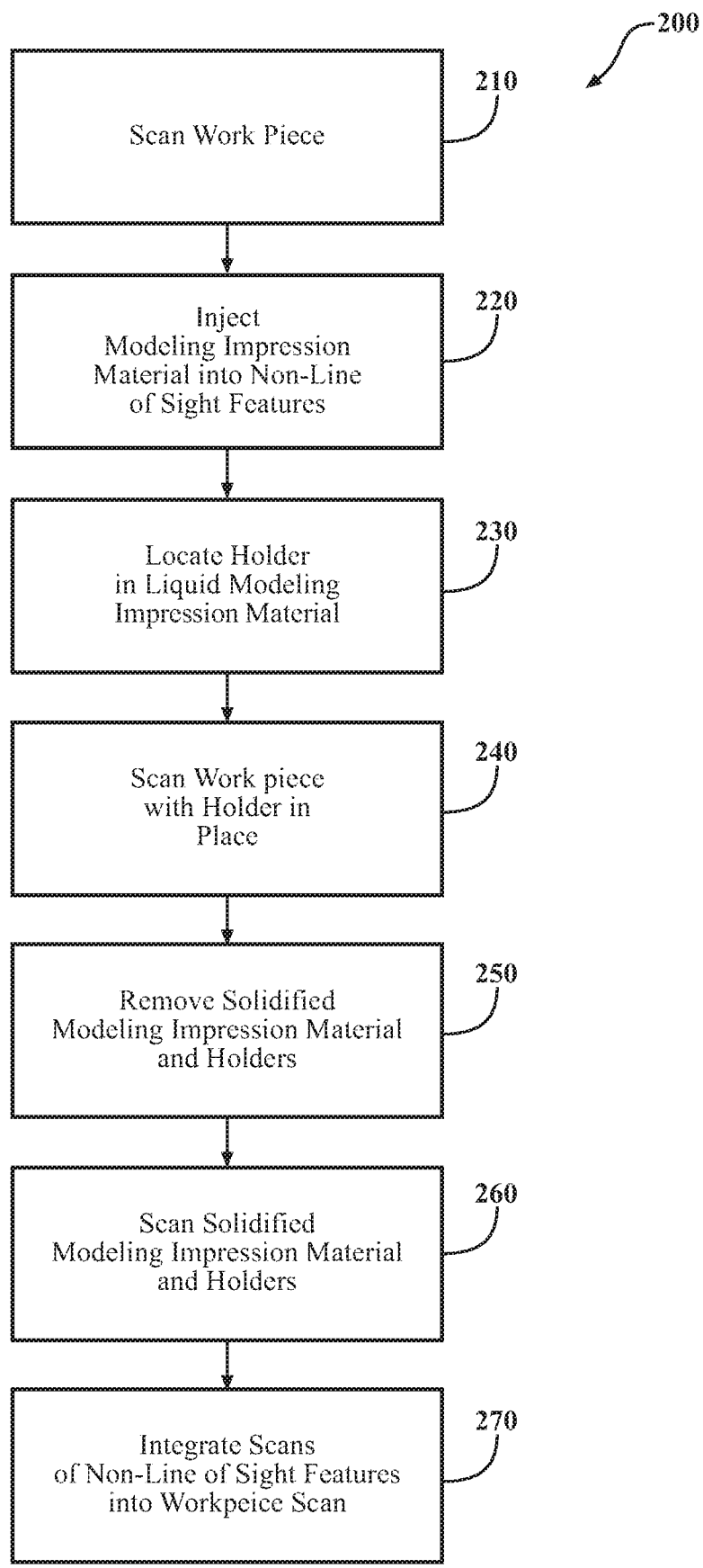

SYSTEM AND METHOD FOR AFFIXING REFERENCE DOTS WITH RESPECT TO MODELING IMPRESSION MATERIALS

CROSS-REFERENCE TO RELATED APPLICATION

The instant application is a divisional application of U.S. patent application Ser. No. 14/872,362 filed Oct. 1, 2015.

BACKGROUND

The present disclosure relates to an optical measurement system and, more particularly, to a holder for non-line of sight features.

Reverse engineering components often employs a white-light scanning technique called ATOS (Advanced Topometric Sensor). This scanning is line of sight only. To capture non-line of sight features such as slots, a modeling impression material can be used to form impressions of the non-line of sight hidden area to be scanned and aligned back into the main workpiece scan at a later date. Alignment is facilitated through the use of reference dots affixed to the surface of the modeling impression material.

One recent type of modeling impression material is a replicator material that flows into the non-line of sight feature like water, and within minutes, sets into shape for subsequent scanning. This liquid type modeling impression material is readily poured into the non-line of sight features but is not conducive to application of reference dots onto the surface when liquid, nor post-hardening, as the reference dots do not affix well to the solidified but relatively soft rubber-like surface.

SUMMARY

A holder to facilitate optical data acquisition according to one disclosed non-limiting embodiment of the present disclosure can include a handle portion; and a float portion to at least partially support the handle portion with respect to a surface of a liquid modeling impression material.

A further embodiment of any of the embodiments of the present disclosure may include, wherein the handle portion is sized to receive at least three reference dots.

A further embodiment of any of the embodiments of the present disclosure may include, wherein the handle portion includes a cap portion transverse to a body portion.

A further embodiment of any of the embodiments of the present disclosure may include, wherein the handle portion includes a cap portion perpendicular to a body portion.

A further embodiment of any of the embodiments of the present disclosure may include, wherein the cap portion is sized to receive at least three reference dots.

A further embodiment of any of the embodiments of the present disclosure may include, wherein a mesh area adjacent to the float portion, the mesh area at least partially immersible within the liquid modeling impression material when the float portion is on the surface of the liquid modeling impression material.

A further embodiment of any of the embodiments of the present disclosure may include, wherein an anchor portion opposite the handle portion.

A further embodiment of any of the embodiments of the present disclosure may include, wherein the anchor portion forms a platform receivable within the liquid modeling impression material.

A further embodiment of any of the embodiments of the present disclosure may include, wherein the holder is additively manufactured.

A further embodiment of any of the embodiments of the present disclosure may include, wherein the holder is configured to be at least partially received within a particular non-line of sight feature of a workpiece.

A further embodiment of any of the embodiments of the present disclosure may include, wherein the holder includes a flow channel to communicate the modeling impression material into the non-line of sight feature.

A holder to facilitate optical data acquisition according to another disclosed non-limiting embodiment of the present disclosure can include a handle portion; an anchor portion to be immersed in a liquid modeling impression material; and a float portion between the handle portion and the anchor portion, the float portion operable to at least partially support the handle portion with respect to a surface of the liquid modeling impression material.

A further embodiment of any of the embodiments of the present disclosure may include, wherein the handle portion is sized to receive at least three reference dots.

A further embodiment of any of the embodiments of the present disclosure may include, wherein a mesh area adjacent to the anchor portion, the mesh area at least partially receivable within the liquid modeling impression material.

A method of optical data acquisition according to another disclosed non-limiting embodiment of the present disclosure can include communicating a liquid modeling impression material into a non-line of sight feature of a workpiece; and immersing a portion of a holder into the liquid modeling impression material.

A further embodiment of any of the embodiments of the present disclosure may include, wherein the portion of the holder immersed in the liquid modeling impression material includes an anchor portion.

A further embodiment of any of the embodiments of the present disclosure may include, wherein the portion of the holder immersed in the liquid modeling impression includes a mesh area.

A further embodiment of any of the embodiments of the present disclosure may include, wherein the portion of the holder immersed in the liquid modeling impression is separated from a handle portion by a float portion.

A further embodiment of any of the embodiments of the present disclosure may include, wherein at least a portion of the float portion floats on the surface of the liquid modeling impression material.

A further embodiment of any of the embodiments of the present disclosure may include, wherein communicating the liquid modeling impression material through the holder then into the non-line of sight feature of the workpiece.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows:

FIG. 7 is a method of optical data acquisition of a non-line of sight feature with the holder.

DETAILED DESCRIPTION

Figure 1:
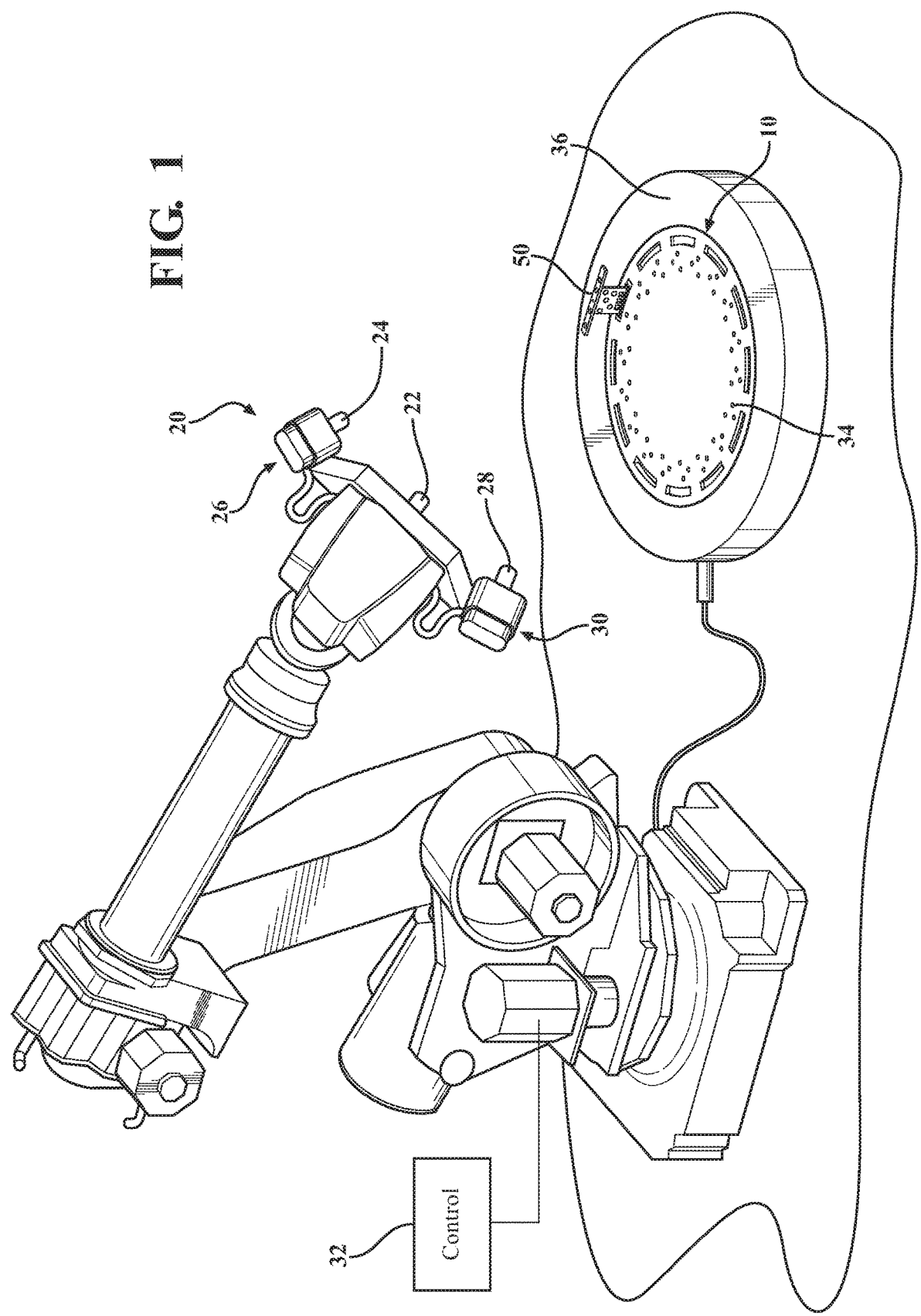
FIG. 1 is a schematic view of an optical data acquisition system.

FIG. 1 schematically illustrates an optical data acquisition system 20 such as ATOS (Advanced Topometric Sensor) system manufactured by GOM mbH of Braunschweig, Germany. It should be appreciated that various systems optical scanner which scans three-dimensional objects and converts the images to high density point clouds may be utilized.

The optical data acquisition system 20 generally includes a light projector 22, a first image capture device 24, such as a digital camera, at a first location 26, a second image capture device 28 at second location 30 and a control subsystem 32. It should be appreciated that although particular components are separately defined, each or any of the components may be otherwise combined or segregated via hardware and/or software.

Figure 2:
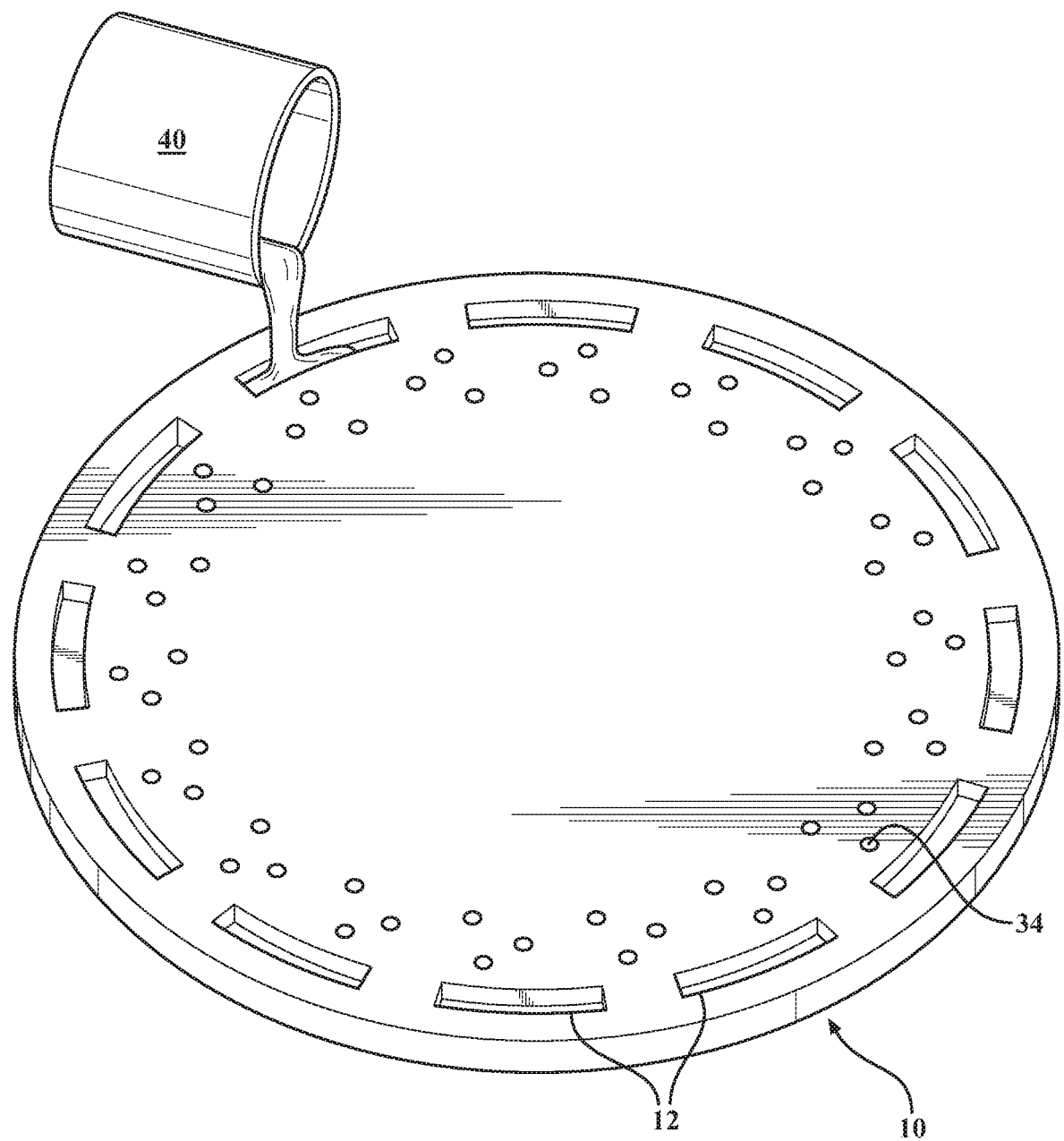
FIG. 2 is a schematic view of an example workpiece.

The optical data acquisition system 20 projects a light pattern onto a workpiece 100 such as, in the illustrated non-limiting embodiment, a rotor disk (FIG. 2). The two image capture devices 24, 28 simultaneously capture images from the two measurement cameras from different angles. This stereo-setup supports accurate 3D capturing of the workpiece 10.

A multitude of reference dots 34 randomly placed on or around the workpiece 10 may also be utilized to form a reference system to match measurements from multiple angles as the workpiece 10 is rotated on a turntable 36. That is, the size and orientation of the reference dots 34, which are of a know size and shape, are imaged then utilized by the optical data acquisition system 20 to provide a frame of reference.

The optical data acquisition system 20 utilizes a minimum of three reference dots 34 within a limited line of sight volume provided by the two image capturing device 24, 28 in any given measurement to determine a point cloud of X, Y, Z coordinates to provide the three-dimensional data acquisition. The control subsystem 32 merges all the images of the encoded dots 34 to triangulate and generate a 3-dimensional relationship and location of all the encoded dots 34. Through triangulation, a surface map of the workpiece 10 is readily constructed by the control subsystem 32 to provide accurate measurement and capture of the shape and size of the visible surface of the workpiece 10.

With reference to FIG. 2, the workpiece 10 often includes non-line of sight features 12 such as a vane hook slot in a gas turbine engine case. It should be appreciated that various non-line of sight features 12 may benefit herefrom. The non-line of sight features 12 may be imaged through the use of a modeling impression material 40 such as, for example, "ScanRubber." ScanRubber is a compound that flows into the feature like water, and within minutes, sets into a hardened solid for subsequent scanning. Although effective, the unique liquid application obviates the setting reference dots onto the surface, as well as application post-hardening, as the reference dots do not affix well to the ScanRubber surface.

The modeling impression material 40 is used to fill the non-line of sight features 12, removed after solidifying, then is scanned and aligned back into the overall scan of the workpiece 10. The modeling impression material 40 is essentially a liquid when communicated into the non-line of sight features 12 to facilitate an accurate representation. Later alignment of the non-line of sight features 12 to the surface map of the workpiece 10 is facilitated through the use of reference dots 34.

Figure 3:
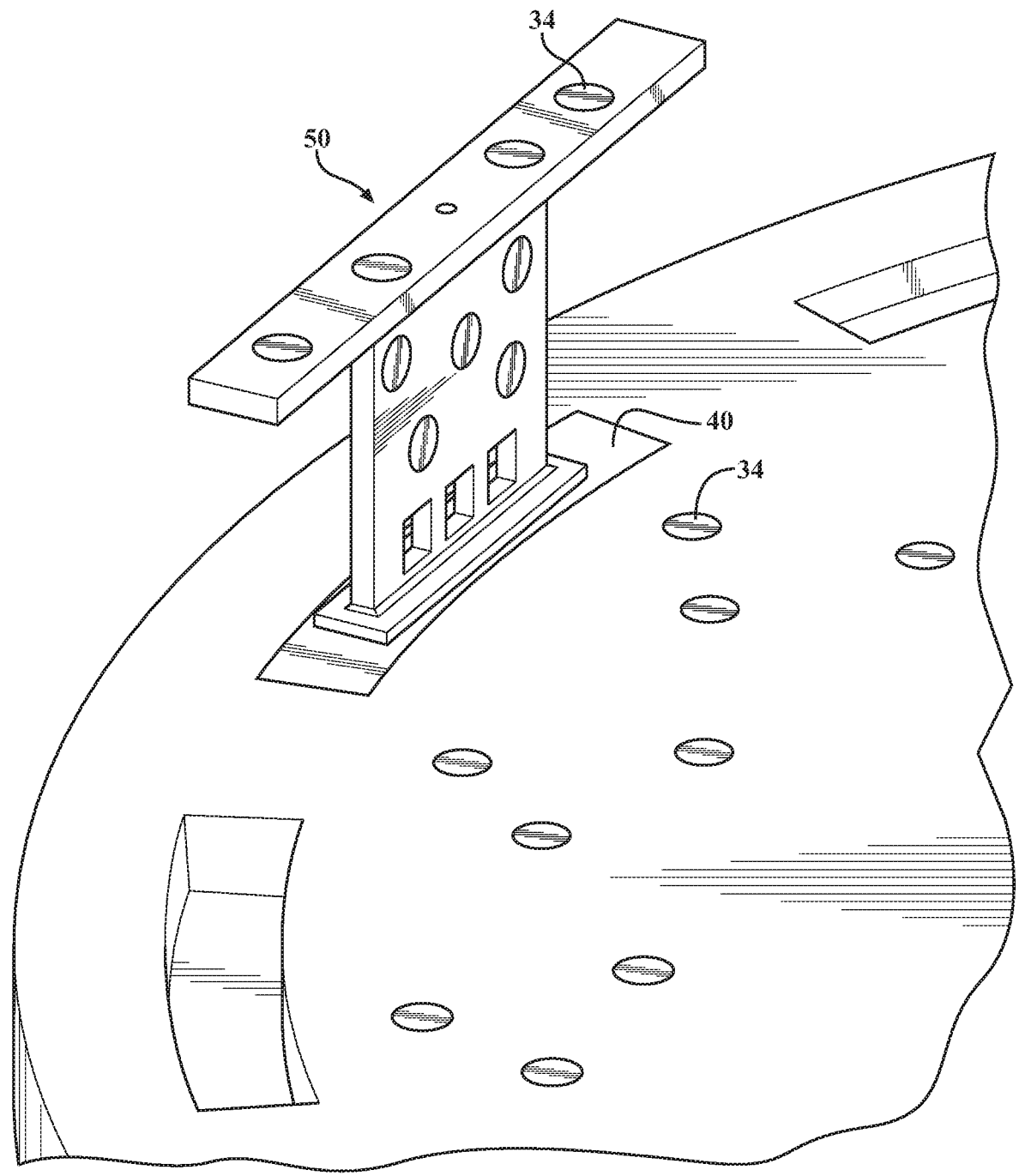
FIG. 3 is a schematic view of a holder to facilitate optical data acquisition within the workpiece.

With reference to FIG. 3, to facilitate placement of the reference dots 34 with respect to the non-line of sight features 12, a holder 50 upon which reference dots 34 are placed is located into the modeling impression material 40 while the modeling impression material 40 is still liquid. In one embodiment, the holder 50 at least partially on the liquid modeling impression material 40 and it then retained therein upon solidification.

Figure 4:
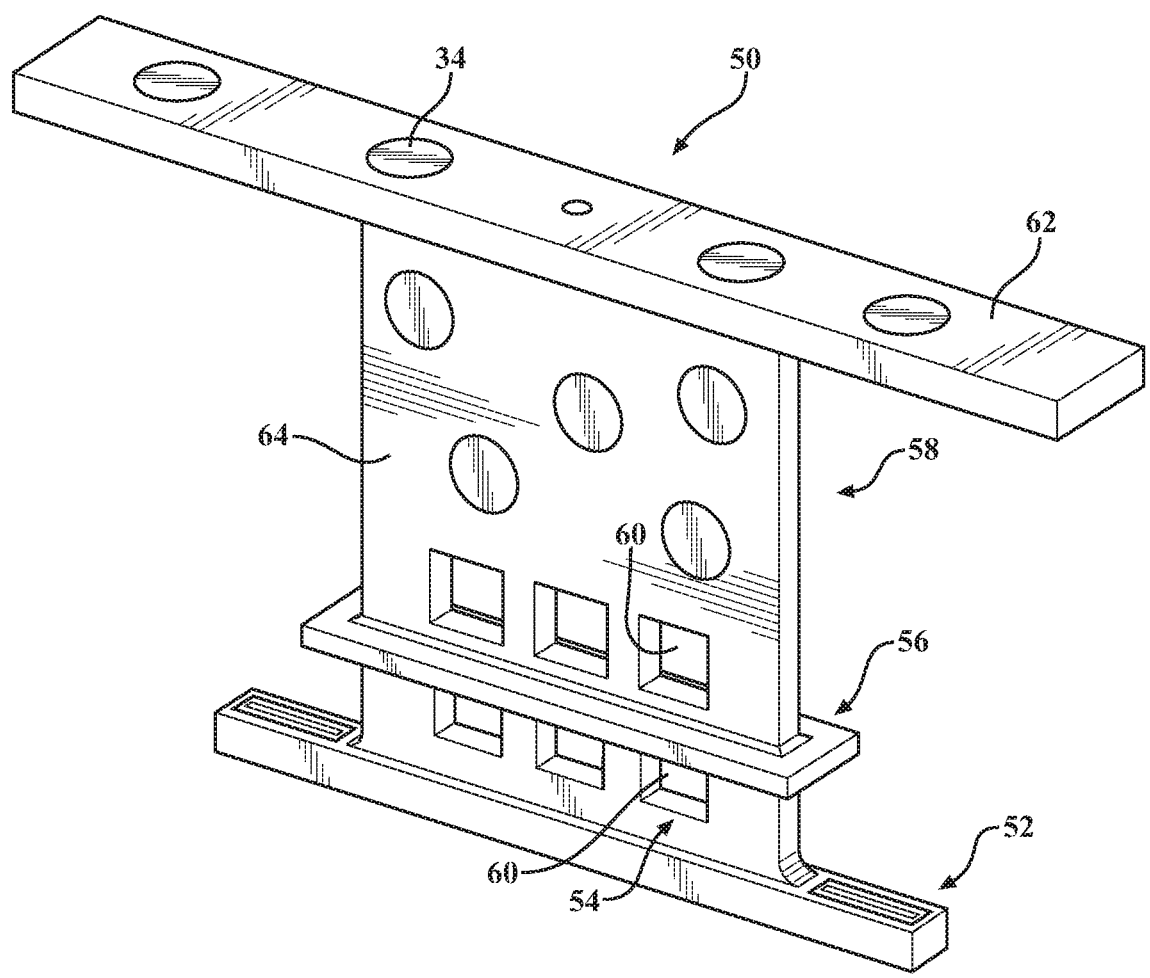
FIG. 4 is a perspective view of a holder to facilitate optical data acquisition.

With reference to FIG. 4, the holder 50 generally includes, an anchor portion 52, a mesh area 54, a float portion 56, and a handle portion 58. The holder 50 may be generic in shape for common non-line of sight features such as slots, apertures, conics, etc., alternatively, the holder 50 may be specifically shaped for single use non-line of sight features and readily manufactured via, for example, additive manufacturing. As the holder 50 is essentially non-structural, the holder 50 need only be retained in fixed position with respect to the modeling impression material 40 to provide a reference frame for the reference dots 34, and need not last much longer than the relatively short-lived modeling impression material 40. The holder 50 may be manufactured of materials such as plastic or other relatively inexpensive materials conducive to additive manufacturing.

Figure 5:
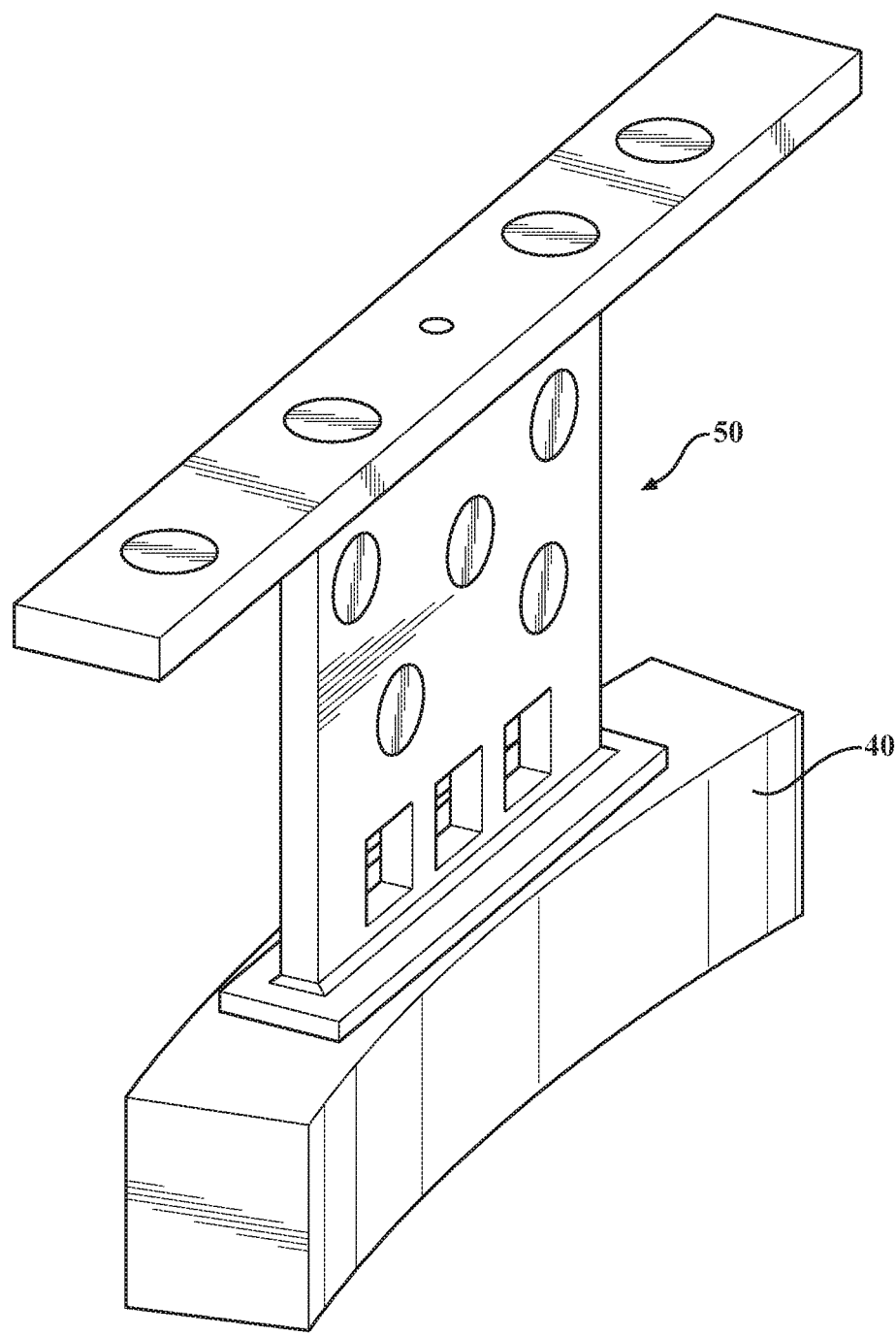
FIG. 5 is a perspective view of a holder affixed within modeling impression material.

The anchor portion 52 may be relatively larger, or shaped differently, than the mesh area 54 to facilitate engagement with the modeling impression material 40 (FIG. 5). The anchor portion 52, in one embodiment, may be a rectilinear platform that extends from a lower portion of the holder 50. The mesh area 54 may include numerous apertures 60 and located adjacent the anchor portion 52 and/or the float portion 56. The apertures 60 of the mesh area 54 permits the modeling impression material 40 to flow therethrough in the liquid state then be readily embedded therein upon solidification. The mesh area 54 may be of various configurations and may optionally be utilized as additional retention structure with the anchor portion 52.

The float portion 56 is located between the anchor portion 53 and the handle portion 58. The float portion 56, in one embodiment, may be a platform that extends from a lower portion of the holder 50 adjacent to the mesh area 54. The float portion 56 is sized and shaped to remain generally upon the surface of the modeling impression material 40 while in the liquid state such that the handle portion 58 remains above the surface (FIG. 5).

The handle portion 58 extends above the float portion 56 and may be of various configurations and shapes. In one embodiment, the handle portion 58 includes a cap portion 62 transverse to a body portion 64 that includes at least some of the mesh area 54. The cap portion 62 may be perpendicular to the body portion 64 to facilitate location of the reference dots 34 in two different measurement planes. It should be appreciated that any number of reference dots 34 may be located on the holder 50 to facilitate integration of the non-line of sight features 12 back into the workpiece 10 via reference dots on both the holder 50 and the workpiece 10 (FIG. 3). That is, the holder 50 forms a new surface inside or above the modeling impression material 40 for use as a reference dot plane as well as a handle portion for grasping, moving, and transporting the solidified material 40 to minimize handling and potential distortion thereof.

Figure 6:
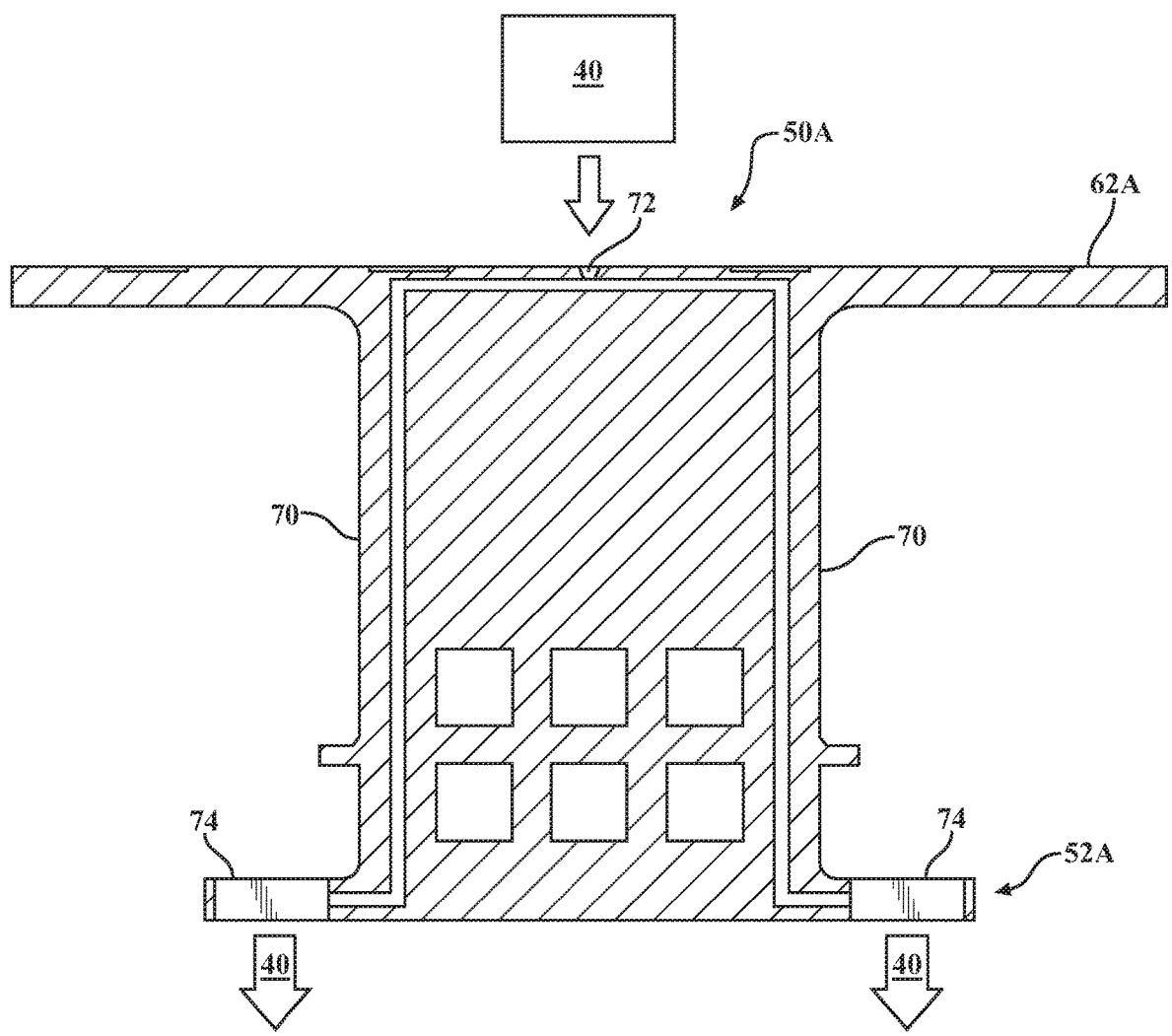
FIG. 6 is a schematic view of a holder according to another embodiment.

With reference to FIG. 6, another disclosed non-limiting embodiment of a holder 50A include flow channels 70 to inject the modeling impression material 40 into the into the non-line of sight features 12 of the workpiece 10. The flow channels 70 may include one or more ports 72 in the cap portion 62A with one or more outlets 74 in the anchor portion 52A. It should be appreciated that various flow channel 70 paths may be utilized to facilitate injection of the liquid modeling impression material 40 into the into the non-line of sight features 12 which, for example, may be relatively difficult to access.

With reference to FIG. 7, one disclosed non-limiting embodiment of a method 200 for use of the holder 50 initially includes scanning the workpiece 10 and the reference dots thereon (step 210). Next, the modeling impression material 40 is injected into the non-line of sight features 12 of the workpiece 10 (step 220). Next, the holder 50 is located in the still liquid modeling impression material 40 such that the float portion 56 remains generally upon the surface of the modeling impression material 40 while in the liquid state such that the handle portion 58 remains above the surface (step 230; FIG. 3). The anchor portion 52 is located below the surface and the mesh area 54 at least partially below the surface to embed into the modeling impression material 40 upon hardening. It should be appreciated that the injection of the liquid modeling impression material 40 into the non-line of sight features 12 may alternatively be performed simultaneous, or subsequent, to location of the holder 50 into the respective non-line of sight feature 12.

The workpiece 10 with the holders 50 in place is then again scanned (step 240). As the holders 50 include reference dots 34, the relative position of each the holder 50 is thereby oriented to the workpiece.

The holder 50, which is embedded within the solidified modeling impression material 40, is then removed from the non-line of sight features 12 (step 250). The solidified modeling impression material 40, provides a positive cast of the negative non-line of sight features 12 to provide the exact contours thereof.

Each solidified modeling impression material 40 representative of the respective non-line of sight feature 12 and the associated holder 50 is then separately scanned (step 260). The reference dots 34 again provide a frame of reference for each solidified modeling impression material 40 representative of the respective non-line of sight feature 12. That is, the holder 50 positions the reference dots 34 to orient the optical data acquisition system 20 at areas otherwise not sufficient surface area for the reference dots 34s The captured scan data for the solidified modeling impression material 40 representative of the respective non-line of sight feature 12 is then integrated in the predefined reference marker framework of the workpiece 10 (step 270). That is, the exact contours of the non-line of sight feature 12 is integrated back into the workpiece 10.

The holder 50 beneficially provides surface inside or above the modeling impression material for use as a reference dot plane as well as a handle portion for grasping, moving, and transporting the modeling material.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to normal operational attitude and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed:

1. A method of optical data acquisition, comprising:
scanning a workpiece and a multiple of reference dots thereon with an optical data acquisition system;
communicating a liquid modeling impression material into a non-line of sight feature of a workpiece;
immersing an anchor portion of a holder into the liquid modeling impression material such that a float portion at least partially supports a handle portion with respect to a surface of the liquid modeling impression material to position a multitude of reference dots on the handle portion such that the multitude of reference dots are visible to the optical data acquisition system;
scanning the workpiece, the holder, and the reference dots thereon with the optical data acquisition system;
removing the holder from the non-line of sight feature with the solidified modeling impression material thereon, the solidified modeling impression material provides a positive cast of the negative non-line of sight feature to provide the exact contours thereof;
scanning the holder and the reference dots thereon after removal with the optical data acquisition system; and
integrating the captured scan data for solidified modeling impression material representative of the respective non-line of sight feature into a predefined reference marker framework of the workpiece.

2. The method as recited in claim 1, further comprising additively manufacturing the holder with respect to the non-line of sight feature.

\* \* \* \* \*